Patented May 16, 1939

2,158,648

UNITED STATES PATENT OFFICE 2,158,648

NITRO DERIVATIVES OF PARA ALKYL SULPHOXIDES OF DIPHENYLAMINES

Werner Zerweck and Heinrich Ritter, Frankfort-on-the-Main-Fechenheim, Germany, assignors to General Aniline Works, Inc., New York, N. Y., a corporation of Delaware No Drawing. Application July 14, 1938, Serial No. 219,204. In Germany July 27, 1937

3 Claims. (Cl. 260—576)

This invention relates to valuable new condensation products of the diphenylamine series, more particularly to those of the general formula:

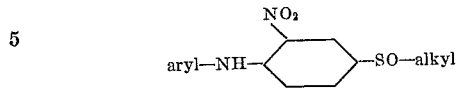

wherein aryl means a radicle of the benzene series and alkyl stands for a low alkyl radicle.

The new condensation products are prepared by condensing 1-halogeno-2-nitrobenzene-4-alkylsulphoxides with aromatic amines of the benzene series. They are especially useful for dyeing lacquers and acetate silk. When acetate silk is dyed with the new products according to the usual methods, bright yellow to yellowish orange shades of very good fastness properties, especially of an excellent fastness to light, are obtained.

The 1-halogeno-2-nitrobenzene-4-alkylsulphoxides employed as one reaction component in the present process may be prepared for example by gently oxidizing the corresponding para-halogenobenzene-thioethers and nitrating at about 20–30° the para-halogenobenzene-alkylsulphoxides thus obtained by means of a mixture of concentrated sulphuric acid with the calculated amount of concentrated nitric acid.

In order to further illustrate our invention the following example is given, the parts being by weight and all temperatures in degrees centigrade.

Example 5 parts of 1-chloro-2-nitrobenzene-4-methylsulphoxide of melting point 95° and 5 parts of p-toluidine are mixed and the mixture is heated to about 150–160° for about half an hour. Then 20 parts of alcohol are added and the mixture is filtered while hot. The 4'-methyl-2-nitrodiphenylamine-4-methylsulphoxide formed of the formula:

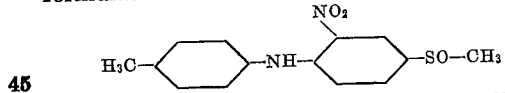

precipitates from the filtrate while cooling. It crystallizes from methanol in yellow crystals of melting point 143–144°, and dyes acetate silk yellow shades of excellent fastness to light.

By employing instead of p-toluidine in the above example the corresponding amount of aniline, the 2-nitrodiphenylamine-4-methylsulphoxide of the formula

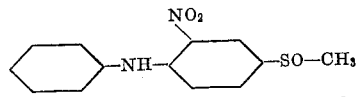

is obtained which melts at 131–132° and dyes acetate silk greenish yellow shades of excellent fastness to light.

Similar valuable condensation products are obtained by employing instead of 1-chloro-2-nitrobenzene-4-methylsulphoxide the homologous compounds such as for example the 1-chloro-2-nitrobenzene-4-ethyl or -propylsulphoxide.

We claim:

1. The condensation products of the diphenylamine series of the general formula:

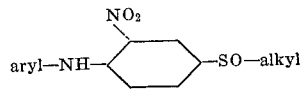

wherein aryl means a radicle of the benzene series and alkyl stands for a low alkyl radicle, which condensation products are useful for dyeing lacquers and acetate silk, whereby bright yellow shades of very good fastness properties are obtained.

2. The 2'-nitrodiphenylamine-4-methylsulphoxide of the formula:

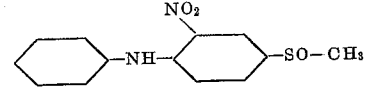

which crystallizes from methanol in yellow crystals of melting point 131–132°, dyeing acetate silk greenish yellow shades of excellent fastness to light.

3. The 4'-methyl-2-nitrodiphenylamine-4-methylsulphoxide of the formula:

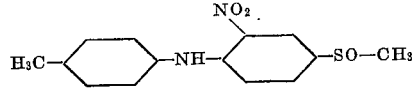

which crystallizes from methanol in yellow crystals of melting point 143–144°, dyeing acetate silk yellow shades of excellent fastness to light.

WERNER ZERWECK.
HEINRICH RITTER.